United States Patent [19]

Uehara et al.

[11] Patent Number: 5,424,859
[45] Date of Patent: Jun. 13, 1995

[54] TRANSCEIVER FOR WIRELESS IN-BUILDING COMMUNICATION SYTEM

[75] Inventors: Kazuhiro Uehara; Kenichi Kagoshima, both of Kanagawa, Japan

[73] Assignee: Nippon Telegraph and Telephone Corp., Tokyo, Japan

[21] Appl. No.: 124,477

[22] Filed: Sep. 22, 1993

[30] Foreign Application Priority Data

Sep. 24, 1992 [JP] Japan ............................ 4-072081 U
Nov. 17, 1992 [JP] Japan ............................ 4-329880

[51] Int. Cl.$^6$ ............................................. H04B 10/00
[52] U.S. Cl. ...................................... 359/152; 359/172; 455/90
[58] Field of Search .................. 359/143, 145–146, 359/152, 172–175, 118; 340/310 A, 310 CP, 825.72; 455/90, 74; 315/34

[56] References Cited

U.S. PATENT DOCUMENTS 5,067,173 11/1991 Gordon et al. ..................... 359/167
5,278,536 1/1994 Furtaw et al. ..................... 340/310 A

FOREIGN PATENT DOCUMENTS 63-308421 12/1988 Japan .
0018326 1/1989 Japan .................................. 359/152

OTHER PUBLICATIONS

"High Speed Wireless LAN Technology ALTAIR and its Application", Computer & Network LAN, Sep. 1992, pp. 1–7.

"Wireless In–Building Network Architecture and Protocols", Buchholz et al, IEEE Network Magazine, Nov. 1991, pp. 31–38.

*Primary Examiner*—Leslie Pascal
*Assistant Examiner*—Kinfe-Michael Negash
*Attorney, Agent, or Firm*—Nikaido, Marmelstein, Murray & Oram

[57] ABSTRACT

A transceiver used for a wireless in-building communication system has a housing which can be fitted with a luminaire having at least one lamp socket to which AC power supply voltage is supplied. At least one lamp base is projected from the housing and is capable of being engaged with the lamp socket so as to receive the AC power supply voltage from the luminaire. A member for radiating/receiving light or electromagnetic wave is disposed on a surface of the housing or in the housing. A power conversion circuit is disposed in the housing so as to convert the AC power supply voltage received via the lamp base into DC voltage having a predetermined voltage value. At least one transmit-receive circuit is disposed in the housing and is coupled with the radiating/receiving member so as to execute transmit-receive operation. The transmit-receive circuit is operated by the DC voltage supplied from the power conversion circuit.

13 Claims, 14 Drawing Sheets

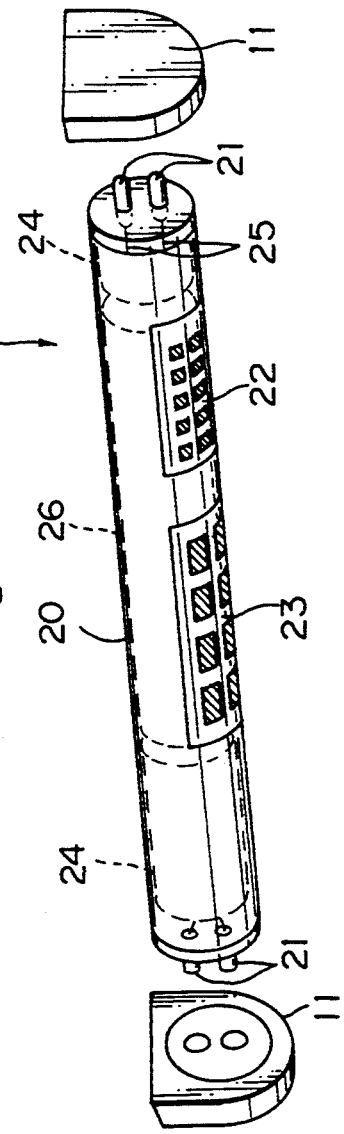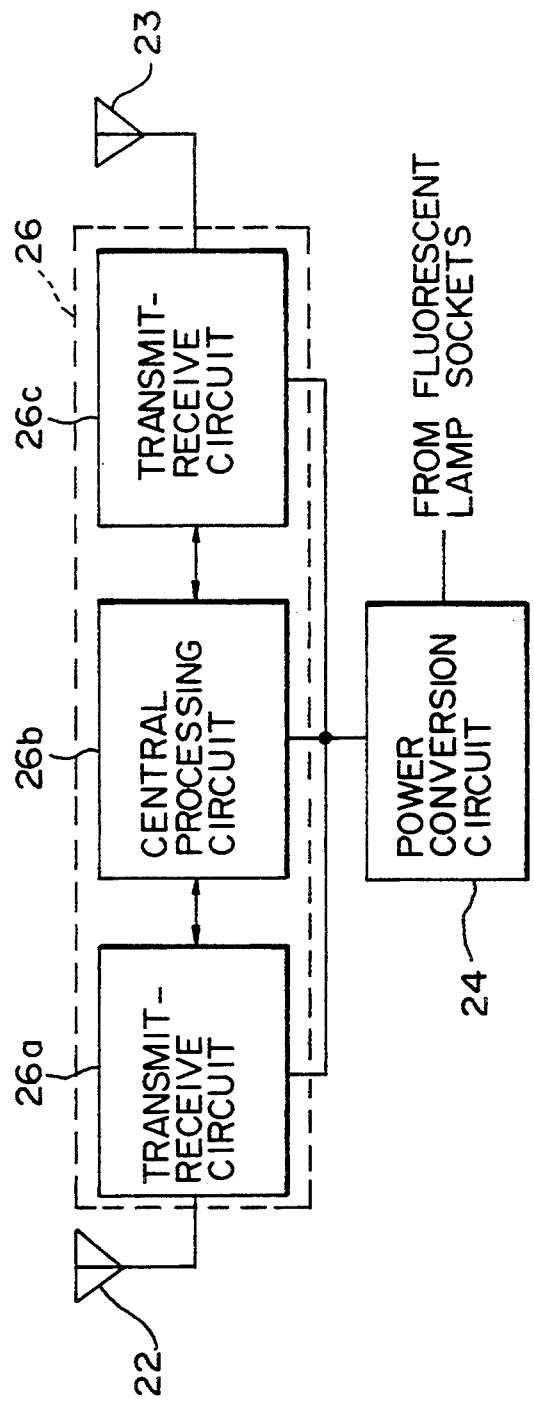
Fig. 2
Fig. 3

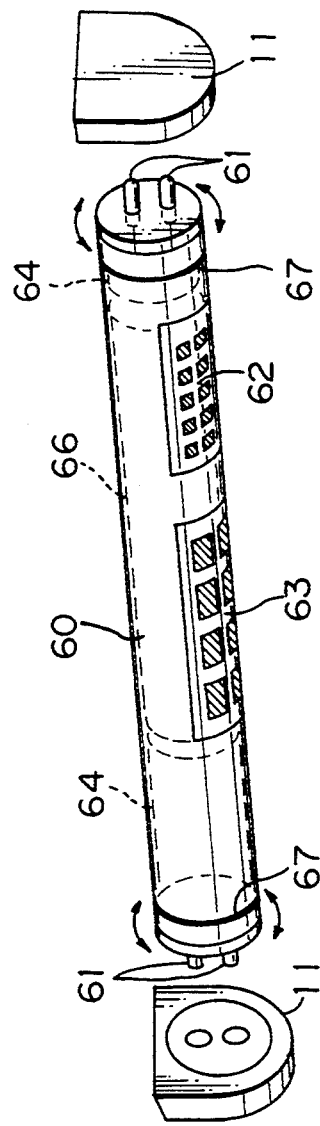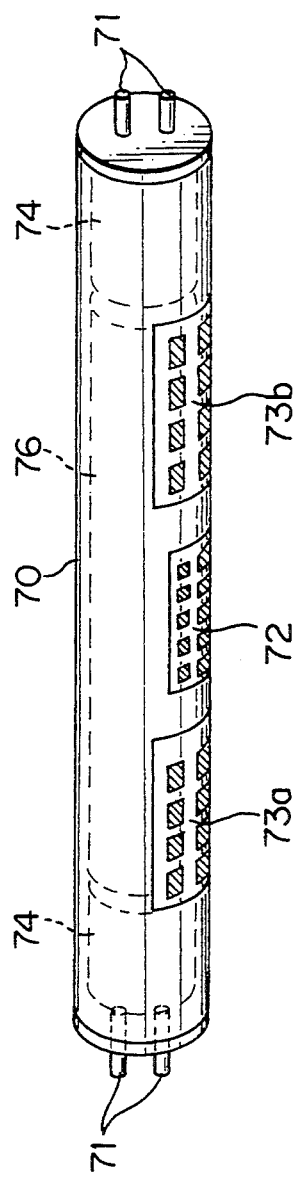

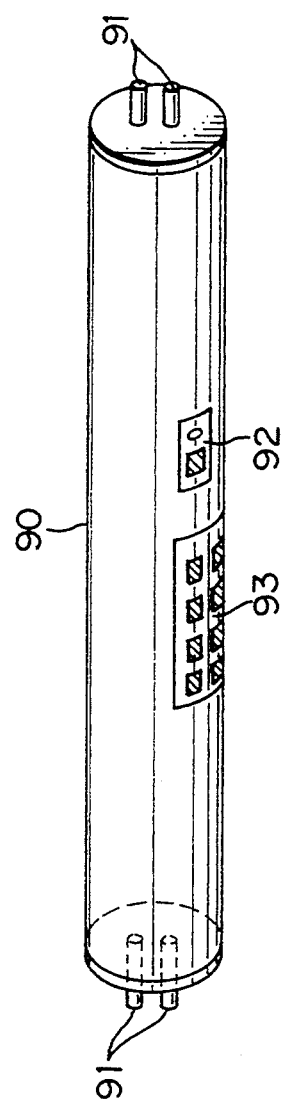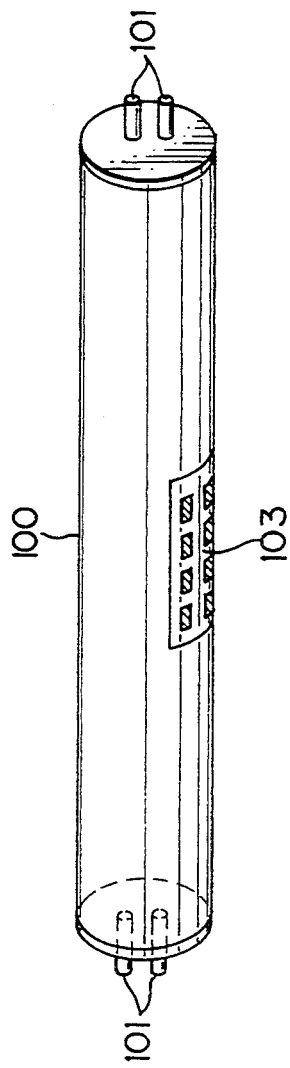

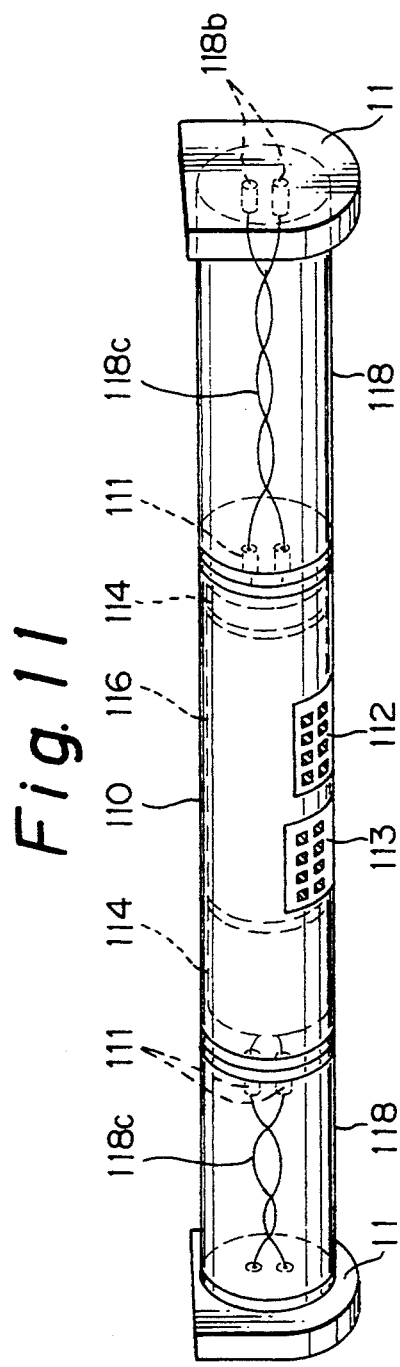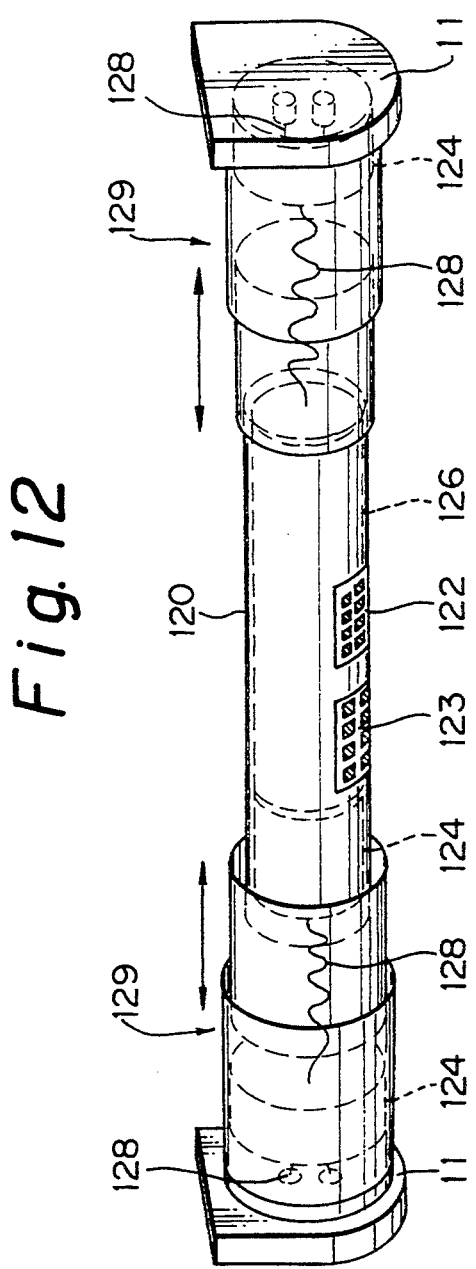

TRANSCEIVER FOR WIRELESS IN-BUILDING COMMUNICATION SYTEM

BACKGROUND OF THE INVENTION

1. Field of the Invention

The present invention relates to a transceiver used for a wireless in-building communication system such as a high-speed wireless LAN (Local Area Network) for example, particularly to a base station transceiver for the wireless LAN, which can be easily installed to a ceiling of the building.

2. Description of the Related Art

Recently, there has been significant interest in wireless LAN which requires no rewiring due to moves, adds or changes of its terminals.

D. Buchholz, P. Odlyzko, M. Taylor and R. White, "Wireless In-Building Network Architecture and Protocols", IEEE Network Magazine, pp. 31–38, November 1991 describes such a wireless LAN. In this system, a single base station transceiver is installed at a ceiling of the building for covering a single zone. Within each zone, one or more user transceiver is disposed. Between the base transceiver and each of the user transceiver, data is transmitted via wireless network. The user transceivers do not directly communicate with one another and are connected to respective terminals such as a personal computer, a workstation and a printer via cables. The base transceiver is connected to a bus of a main processor and a main memory in the base station via a cable. Thus, between the base transceiver and the bus, data will be transmitted via the cable.

In such wireless LAN, it is required to install the base transceiver at the ceiling of the building so as to obtain good transmission performance. However, in most of existing buildings, especially in buildings for offices, department stores or restaurants which have a great demand for the wireless LAN, it will be impossible to execute construction for installing the conventional base transceiver to the ceiling. Even if the base transceiver can be attached to the ceiling, difficult construction for wiring, in the ceiling or along the surface of the ceiling, a data transmission cable connecting the base transceiver with the base station is required. Also, in order to supply commercial AC power to the base transceiver installed at the ceiling, it is necessary that a power supply cable is wired in the ceiling or along the surface of the ceiling from an existing electric outlet to the base transceiver or that an additional outlet is constructed near the base transceiver by making a hole through the ceiling. Furthermore, since the base transceiver is so heavy in weight (e.g. about 3 Kg) that most ceilings cannot sufficiently support it, the position at which the base transceiver will be attached may be restricted or in some cases construction for reinforcing the ceiling may be needed.

Labor and material costs for wiring the cables and for reinforcing the ceiling will be significant, particularly when the number of the base transceivers is great, the costs will increase extremely. According to the conventional wireless LAN system, furthermore, these wiring and reinforcement are required even if the system is temporarily installed only when council or exhibition is held.

SUMMARY OF THE INVENTION

It is therefore an object of the present invention to provide a transceiver for a wireless in-building communication system, which can be easily installed in a building.

Another object of the present invention is to provide a transceiver for a wireless in-building communication system, which is not necessary for wiring a data transmission cable and a power supply cable.

A further object of the present invention is to provide a transceiver for a wireless in-building communication system, which can be installed at an adequate position of the ceiling without executing additional construction.

Still a further object of the present invention is to provide a transceiver for a wireless in-building communication system, which can be easily removed.

According to the present invention, a transceiver used for a wireless in-building communication system has a housing which can be fitted with a luminaire having at least one lamp socket to which AC power supply voltage is supplied. At least one lamp base is projected from the housing and can be engaged with the lamp socket so as to receive the AC power supply voltage from the luminaire. A member for radiating/receiving light or electromagnetic wave such as a radio antenna or a photo emitter/receiver is disposed on a surface of the housing or in the housing. A power conversion circuit is disposed in the housing so as to convert the AC power supply voltage received via the lamp base into DC voltage having a predetermined voltage value. At least one transmit-receive circuit is disposed in the housing and is coupled with the radiating/receiving member so as to execute transmit-receive operation. The transmit-receive circuit is operated by the DC voltage supplied from the power conversion circuit.

As mentioned above, the transceiver according to the present invention has a housing capable of being fitted with the existing luminaire already installed on the ceiling and at least one lamp base capable of being engaged with a lamp socket of the luminaire. Therefore, the transceiver can be easily installed to the ceiling in a building without executing any additional construction. Furthermore, since the transceiver can receive commercial power voltage from the power supply of the luminaire, no power supply cable is necessary for additionally wiring in order to energize the transceiver itself. Also, since wireless data transmission is executed with the transmit-receive bus interface device connected to the bus of LAN, no data transmission cable is necessary for additional wiring between the transceiver and the bus interface device. As a result, many of these base transceivers can be extremely easily installed in existing buildings and also in existing factories.

Since the transceiver according to the present invention is also easily removed from the ceiling, it is very convenient to use in a temporal network such as a network of council or a network of an exhibition. In general, as a great number of luminaires are installed on the ceiling, a position at which the transceiver of the present invention is to be installed can be freely selected. This causes design of zones to become easier. Also, the transceiver will be mounted at an adequate position of the ceiling without executing additional construction for reinforcing the ceiling. Furthermore, even in the building where the transmission paths are very complicated, the best passage with the highest transmission quality can be secured.

It is preferred that the radiating/receiving member includes a first radiating/receiving member provided with a directional pattern of a small half-power beam width, and a second radiating/receiving member with a directional pattern of a large half-power beam width. The first radiating/receiving member will be used for wireless transmission with a transmit-receive bus interface device, and the second radiating/receiving member will be used for wireless transmission with at least one user transceiver.

The radiating/receiving member may include a single member for radiating/receiving light or electromagnetic wave provided with a directional pattern of a large half-power beam width. This single radiating/receiving member will be used for wireless transmission with a transmit-receive bus interface device and with at least one user transceiver.

Preferably, at least one of the first and second radiating/receiving member may include a radio antenna or a photo emitter/receiver.

If a part of the housing itself is utilized as elements of the antenna, the number of the elements can be reduced and also the antenna can be more easily constructed.

The second radiating/receiving member may include two radio antennas having diversity function.

It is preferred that the transceiver includes at least one rotary joint fixed to the housing so that the lamp base is rotatable with respect to the housing by at least ±180 degrees. As the housing can be rotated after fitting it with the luminaire, the radiating/receiving member can be always set to optimum directions. For example, an antenna having sharp directional pattern can be rotated to direct toward the bus interface device.

Preferably, the power conversion circuit includes a voltage conversion circuit for converting the received AC power supply voltage into AC voltage having a predetermined voltage value, a rectifying circuit for converting the AC voltage into DC voltage, and a chargeable battery coupled in parallel to the outputs of the rectifying circuit. This battery supplies all the circuits in the transceiver with DC power voltage so that the transmit-receive operation can be maintained even when the commercial power supply is turned off by mistake.

The luminaire may be a fluorescent-lamp luminaire having two lamp sockets. In this case, two lamp bases will be formed at respective ends of the tubular housing, and each of the lamp bases will have two base pins projected at its end and capable of being inserted into the lamp socket.

It is preferred that the transceiver includes two tubular housing adapters axially coupled to respective ends of the housing. Thus, the transceiver can be fitted to various fluorescent-lamp luminaires having different intervals of sockets. If the housing adapters have additional lamps, it can redress lowering of illumination due to the change of the existing fluorescent lamp to the transceiver.

It is preferred that the housing includes a telescopic tubular housing with axially variable length. Thus, the transceiver can be fitted to various fluorescent-lamp luminaires having different intervals of sockets.

The luminaire may be an incandescent-lamp luminaire having a single lamp socket, and a single lamp base may be formed at an end of the housing, which lamp base can be inserted into the lamp socket.

The luminaire may be a ceiling luminaire directly attached to a ceiling, or a pendant luminaire.

Further objects and advantages of the present invention will be apparent from the following description of the preferred embodiments of the invention as illustrated in the accompanying drawings.

BRIEF DESCRIPTION OF THE DRAWINGS

FIG. 2 schematically shows a preferred embodiment of a transceiver according to the present invention, which is used in the wireless LAN system shown in FIG. 1;

FIG. 3 shows a block diagram illustrating an inner electrical constitution of the transceiver shown in FIG. 2;

FIG. 6 schematically shows an another embodiment of a transceiver according to the present invention, which is used in the wireless LAN system shown in FIG. 1;

FIG. 7 schematically shows a further embodiment of a transceiver according to the present invention, which is used in the wireless LAN system shown in FIG. 1;

FIG. 9 schematically shows a still further embodiment of a transceiver according to the present invention, which is used in the wireless LAN system shown in FIG. 1; 70 degrees;

FIG. 10 schematically shows an another embodiment of a transceiver according to the present invention, which is used in the wireless LAN system shown in FIG. 1;

FIG. 11 schematically shows an another embodiment of a transceiver according to the present invention, which is used in the wireless LAN system shown in FIG. 1;

FIG. 12 schematically shows a further embodiment of a transceiver according to the present invention, which is used in the wireless LAN system shown in FIG. 1;

DESCRIPTION OF THE PREFERRED EMBODIMENTS

Figure 1:
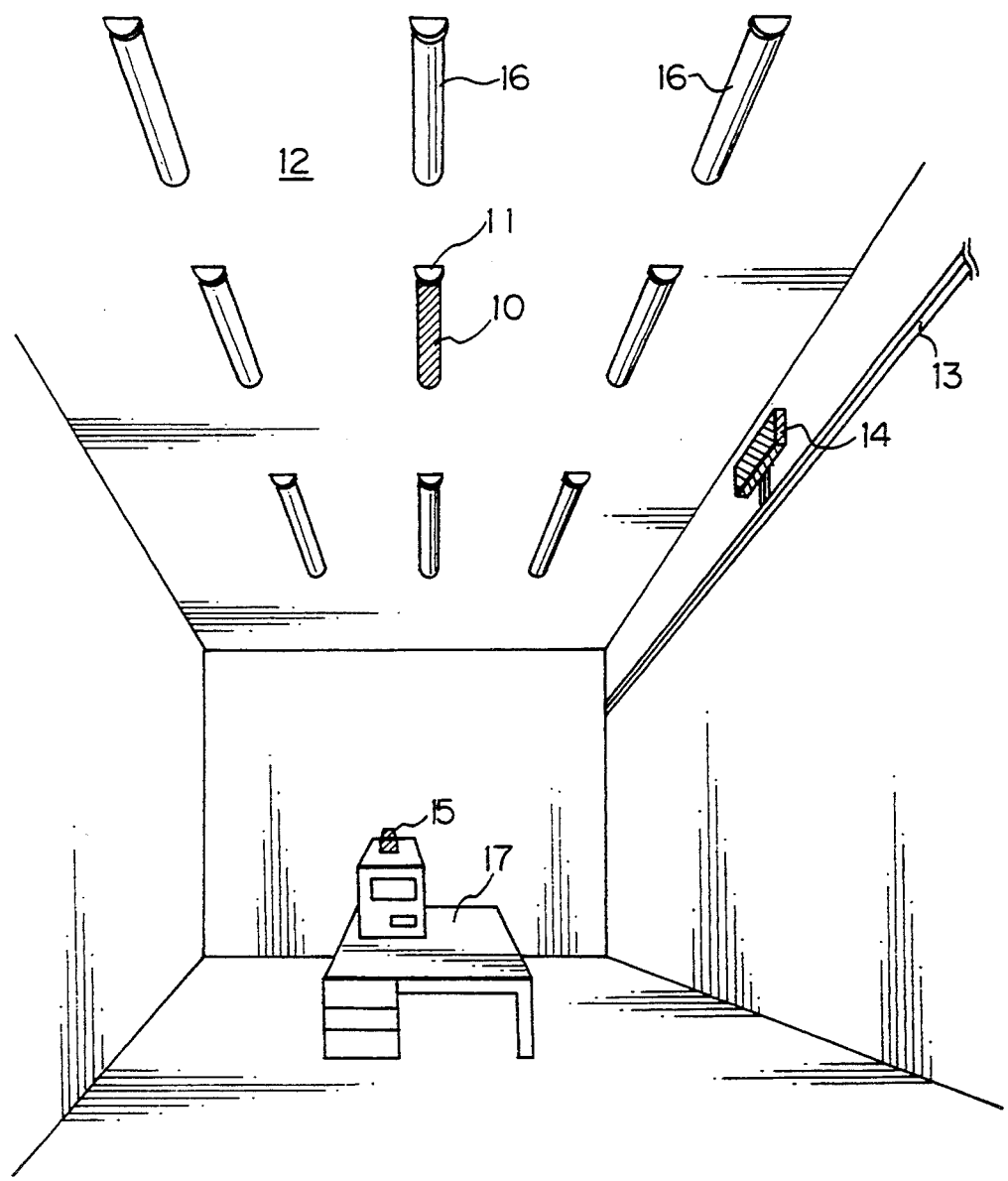
FIG. 1 shows in perspective an example of a wireless LAN system using a transceiver according to the present invention.

Referring to FIG. 1 which shows in perspective an example of a wireless LAN system using a base transceiver according to the present invention, reference numeral 10 denotes the base transceiver fitted, instead of a linear type fluorescent lamp, to fluorescent lamp sockets 11 of a fluorescent-lamp luminaire installed at the ceiling 12 of an office building. In FIG. 1, furthermore, reference numeral 13 denotes a bus of a LAN, installed along the inner wall of the office, 14 a transmit-receive bus interface device, and 15 a user transceiver disposed in the office and connected to a user terminal.

In general, a plurality of fluorescent-lamp luminaires are installed at the ceiling 12 of the office and at least one of linear type fluorescent lamp 16 is fitted with each of the luminaires. In order to install the base transceiver 10, one of the fluorescent lamps 16, preferably one positioned near the center of the ceiling, is removed from the luminaire and then base pins of the transceiver 10 having a housing with the similar shape as that of the removed fluorescent lamp is inserted into its lamp sockets 11.

By using radio antennas provided on the surface of the housing or in the housing, the transceiver 10 will execute radio data transmission with the bus interface device 14 and execute radio data transmission with the user transceiver 15 on a desk 17.

FIG. 2 is an exploded view schematically showing a preferred embodiment of the transceiver used in the wireless LAN system shown in FIG. 1 and the lamp sockets 11 of the fluorescent-lamp luminaire attached to the ceiling as mentioned before. The transceiver 10, according to this embodiment, has a tubular housing 20 with substantially the same shape and dimension as those of the general linear type fluorescent lamp. The transceiver 10 also has lamp bases at the both axial ends of the housing 20, respectively. Two base pins 21 are projected from the respective lamp bases and thus these base pins 21 can be detachably inserted into the sockets 11 so that the transceiver receives the power supply voltage from the fluorescent-lamp luminaire when inserted. It is a matter of course that these base pins 21 have the same standard as that of base pins of the general fluorescent lamp 16. The shape and dimension of the housing 20 may be freely modified so long as it can be fitted with the fluorescent-lamp luminaire.

First and second antennas 22 and 23 for radiating-/receiving electromagnetic wave are formed on the outer or inner surface of the housing 20 or in the housing 20. The housing 20 itself may be made of various material such as metallic material or material which passes light or electromagnetic wave. If the housing 20 is made of dielectric material, a part of it can be utilized as a micro-strip substrate of the antennas. If it is made of metal, it may be used as a ground plane of the antennas. In the case that a part of the housing 20 itself is utilized as elements of the plane antennas, the number of the elements can be reduced and also the antennas can be more easily constructed.

In the housing 20, there is a power conversion circuit 24, electrically connected to the base pins 21 via wires 25, for converting the received AC power supply voltage into DC voltage having a predetermined voltage value, and a transmit-receive unit 26.

FIG. 3 shows a block diagram schematically illustrating an inner electrical constitution of the transceiver 10. As shown in this figure, the first antenna 22 is electrically connected to a first transmit-receive circuit 26a and the second antenna 23 is electrically connected to a second transmit-receive circuit 26c. The first and second transmit-receive circuits 26a and 26c are electrically connected to a central processing circuit 26b. These first transmit-receive circuit 26a, central processing circuit 26b and second transmit-receive circuit 26c constituting the transmit-receive unit 26 shown in FIG. 2 are supplied with DC power voltage from the power conversion circuit 24.

The first and second antennas 22 and 23 have respective directional patterns which are different from each other. The first antenna 22, having a directional pattern such as a pencil beam of a small half-power beam width, is used for radio data transmission with the transmit-receive bus interface device 14 (shown in FIG. 1). The second antenna 23 having a directional pattern, such as a fan beam of a large half-power beam width, is used for radio data transmission with the user transceiver disposed on the desk 17 (shown in FIG. 1) or with other user transceivers (not shown). By scanning the beam of the second antenna 23 or by switching its beams, the best path with the highest transmission quality can be secured between the base transceiver and each of the user transceivers. In this embodiment, centimeter wave near millimeter wave, with frequency range of about 20 to 30 GHz is adopted for the carrier wave of the transceiver, and four-phases QPSK system is used for modulation. However, the frequency range of the carrier wave and the modulation system of the transceiver according to the present invention will not be limited to the above-mentioned particular range and system.

Figure 4:
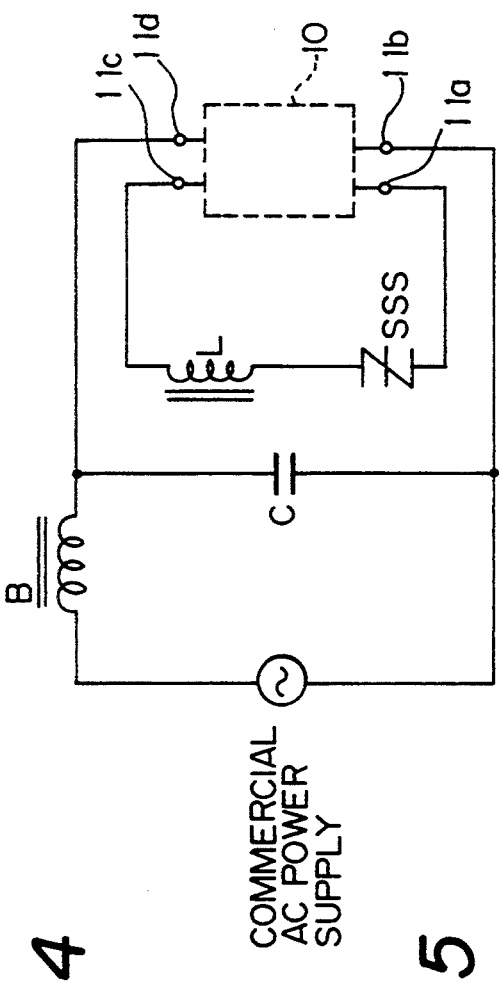
FIG. 4 shows a block diagram schematically illustrating an electrical circuit of a fluorescent-lamp luminaire to which the transceiver shown in FIG. 2 will be connected.

FIG. 4 shows a block diagram schematically illustrating an electrical circuit of the fluorescent-lamp luminaire to which the transceiver shown in FIG. 2 is connected. In the figure, B denotes a ballast, C denotes a capacitor, and L and SSS denote an inductor and a thyristor constituting a lighting starter circuit of the fluorescent lamp, respectively. The inductor L and thyristor SSS of the lighting starter circuit are connected in series between two terminals 11a and 11c of the fluorescent lamp socket 11, and a commercial AC power supply and the ballast B are connected in series between the remaining two terminals 11b and 11d of the socket 11. Therefore, by selecting the two terminals 11b and 11d coupled to the commercial AC power supply, although there may be a little voltage drop due to the ballast B, AC power sufficient for energizing the small type transceiver 10 can be obtained.

Figure 5:
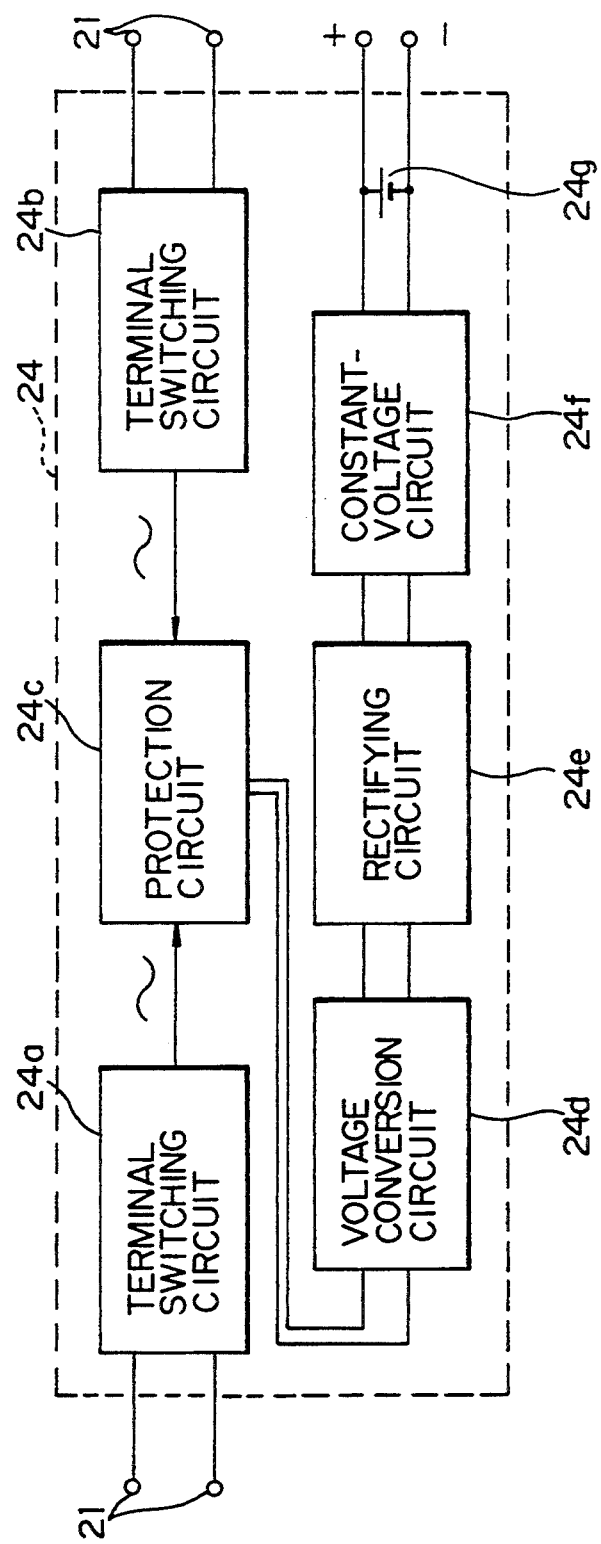
FIG. 5 shows a block diagram schematically illustrating an electrical constitution of a power conversion circuit of the transceiver shown in FIG. 2.

FIG. 5 shows a block diagram schematically illustrating an electrical constitution of the power conversion circuit 24 of the transceiver 10 shown in FIG. 2. In the figure, reference numerals 24a and 24b denote first and second terminal switching circuits connected to four base pins 21. These first and second terminal switching circuits 24a and 24b are circuits with switches for selecting the two terminals 11b and 11d coupled to the commercial AC power supply, among the four terminals of the socket 11. A protection circuit 24c connected between the switching circuits 24a and 24b is a voltage regulator for protecting all the circuits in the transceiver 10 from high voltage which may be produced at a time when the power is turned on or when the circuit is cut off. A voltage conversion circuit 24d for converting the commercial AC voltage into a predetermined voltage (several volts to over ten volts) is connected to the outputs of the protection circuit 24c, and a rectifying circuit 24e for converting AC voltage into DC voltage is connected to the outputs of the conversion circuit 24d. A constant-voltage circuit 24f is connected to the outputs of the rectifying circuit 24e. The outputs of the constant-voltage circuit 24f are connected to the outputs of the power conversion circuit 24. A chargeable battery 24g is connected in parallel to the outputs of the circuit 24. This battery 24g supplies all the circuits in the transceiver 10 with DC power voltage so that the transmit-receive operation can be maintained even when the commercial power supply is turned off by mistake.

As aforementioned, the transceiver according to this embodiment can receive power voltage from the power supply of the fluorescent-lamp luminaire installed on the ceiling of the building only by fitting the transceiver with the luminaire instead of the fluorescent lamp. Thus, no power supply cable is necessary for additionally wiring in order to energize the base transceiver. Also, since the transceiver is fitted to the existing luminaire already installed on the ceiling, it can be installed at an adequate position of the ceiling without executing additional construction such as a construction for reinforcing the ceiling. Furthermore, since wireless data transmission is executed with the transmit-receive bus interface device connected to the bus of LAN, no data transmission cable is necessary for additionally wiring between the base transceiver and the bus interface device.

FIG. 6 is an exploded view schematically showing another embodiment of the transceiver used in the wireless LAN system shown in FIG. 1 and the lamp sockets 11 of the fluorescent-lamp luminaire attached to the ceiling as mentioned before. The base transceiver according to this embodiment has a tubular housing 60 with substantially the same shape and dimension as these of the general linear type fluorescent lamp. The transceiver also has lamp bases at the both axial ends of the housing 60, respectively. Two base pins 61 are projected from the respective lamp bases and thus these base pins can be detachably inserted into the sockets 11 so that the transceiver receives the power supply voltage from the fluorescent-lamp luminaire when inserted. It is a matter of course that these base pins 61 have the same standard as that of base pins of the general fluorescent lamp. The shape and dimension of the housing 60 may be freely modified so long as it can be fitted with the fluorescent-lamp luminaire.

First and second antennas 62 and 63 for radiating/receiving electromagnetic wave are formed on the outer or inner surface of the housing 60 or in the housing 60. In the housing 60, there is a power conversion circuit 64, electrically connected to the base pins 61, for converting the received AC power supply voltage into DC voltage having a predetermined voltage value, and a transmit-receive unit 66. Constitution and operation of the first and second antennas 62 and 63, the power conversion circuit 64, and the transmit-receive unit 66 are completely the same as these of the base transceiver of FIG. 2.

According to this embodiment, rotary joints 67 are attached to the housing 60 at respective jointing portions between the ends of the housing 60 and the lamp bases, respectively. By means of these rotary joints 67, the housing 60 is rotatable for ±180 degrees with respect to its central axis even when the housing is fixed by engaging the lamp bases with the sockets 11. As the housing 60 can be rotated after fitting it with the luminaire, the antennas can be always set to optimum directions. Another constitution and advantages of the transceiver according to this embodiment are the same as those of the embodiment of FIG. 2.

FIG. 7 schematically shows a further embodiment of the transceiver according to the present invention, used in the wireless LAN system shown in FIG. 1. The base transceiver according to this embodiment has a tubular housing 70 with substantially the same shape and dimension as those of the general linear type fluorescent lamp. The transceiver also has lamp bases at the both axial ends of housing 70, respectively. Two base pins 71 are projected from the respective lamp bases and thus these base pins can be detachably inserted into the sockets 11 so that the transceiver receives the power supply voltage from the fluorescent-lamp luminaire when inserted. It is a matter of course that these base pins 71 have the same standard as that of base pins of the general fluorescent lamp. The shape and dimension of the housing 70 may be freely modified so long as it can be fitted with the fluorescent-lamp luminaire.

First, second and third antennas 72, 73a and 73b for radiating/receiving electromagnetic wave are formed on the outer or inner surface of the housing 70 or in the housing 70. In the housing 70, there is a power conversion circuit 74, electrically connected to the base pins 71, for converting the received AC power supply voltage into DC voltage having a predetermined voltage value, and a transmit-receive unit 76.

Figure 8:
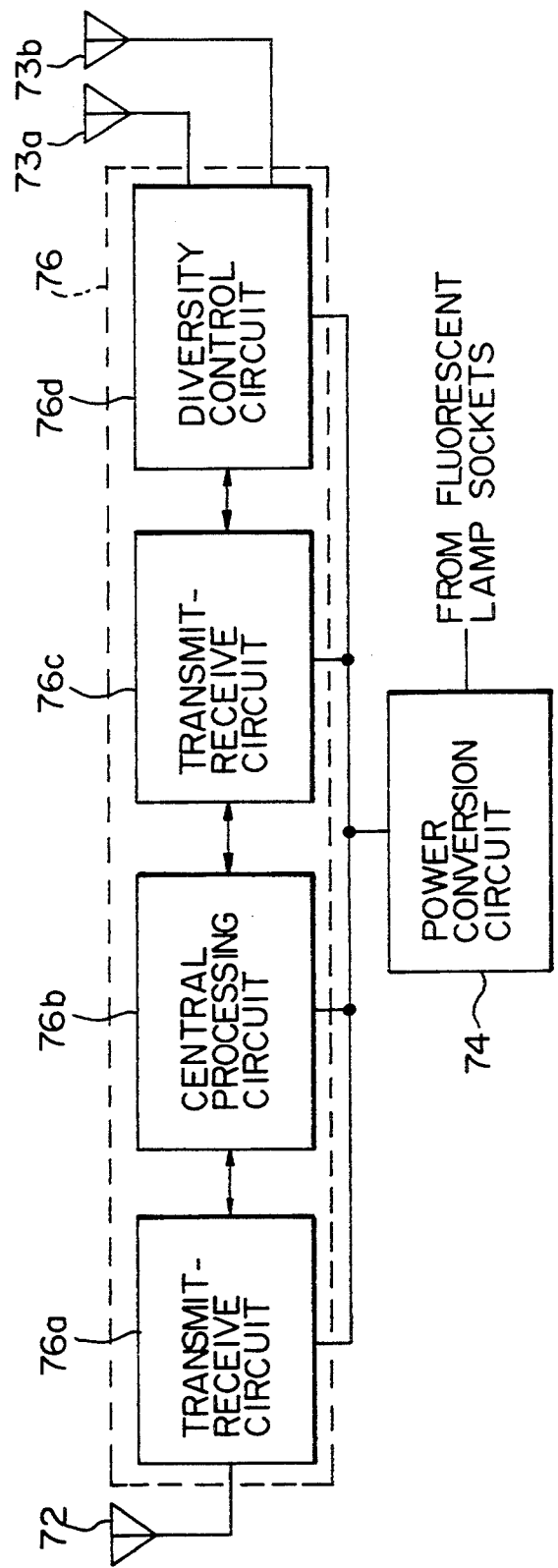
FIG. 8 shows a block diagram illustrating an inner electrical constitution of the transceiver shown in FIG. 7.

FIG. 8 shows a block diagram illustrating an inner electrical constitution of the transceiver 70. As shown in this figure, the first antenna 72 is electrically connected to a first transmit-receive circuit 76a, and the second and third antennas 73a and 73b are electrically coupled to a second transmit-receive circuit 76c via a diversity control circuit 76d. The first and second transmit-receive circuits 76a and 76c are electrically connected to a central processing circuit 76b. These first transmit-receive circuit 76a, central processing circuit 76b, second transmit-receive circuit 76c and diversity control circuit 76d constituting the transmit-receive unit 76 shown in FIG. 7 are supplied with DC power voltage from the power conversion circuit 74. Constitution and operation of the power conversion circuit 74 are completely the same as those of the power conversion circuit 24 in the embodiment of FIG. 2.

The first antenna 72 has different directional pattern from that of the second and third antennas 73a and 73b. The first antenna 72, having a directional pattern such as a pencil beam of a small half-power beam width, is used for radio data transmission with the transmit-receive bus interface device 14 (shown in FIG. 1). The second and third antennas 73a and 73b having a directional pattern such as a fan beam of a large half-power beam width operate as diversity antennas and are used for radio data transmission with the user transceiver 15 disposed on the desk 17 (shown in FIG. 1) or with another user transceivers (not shown). By switching the diversity antennas, even in a building where the transmission paths are very complicated, the best path with the highest transmission quality can be secured between the base transceiver and each of the user transceivers. Another constitution and advantages of the transceiver according to this embodiment are the same as those of the embodiment of FIG. 2.

FIG. 9 schematically shows a still further embodiment of the transceiver according to the present invention, used in the wireless LAN system shown in FIG. 1. The base transceiver according to this embodiment has a tubular housing 90 with substantially the same shape and dimension as these of the general linear type fluorescent lamp. The transceiver also has lamp bases at the both axial ends of the housing 90, respectively. Two base pins 91 are projected from the respective lamp bases and thus these base pins can be detachably inserted into the sockets 11 so that the transceiver receives the power supply voltage from the fluorescent-lamp luminaire when inserted. It is a matter of course that these base pins 91 have the same standard as that of base pins of the general fluorescent lamp. The shape and dimension of the housing 90 may be freely modified so long as it can be fitted with the fluorescent-lamp luminaire.

On the outer or inner surface of the housing 90 or in the housing 90, a photo emitter/detector 92 for radiating/receiving light is formed instead of the first antenna 22 in the embodiment of FIG. 2, and also an antenna 93 similar to the second antenna 23 is formed.

The photo emitter/detector 92, having a directional pattern such as a pencil beam of a small half-power beam width, is used for optical data transmission with the transmit-receive bus interface device 14 (shown in FIG. 1). The antenna 93 having a directional pattern such as a fan beam of a large half-power beam width is used for radio data transmission with the user transceivers disposed on the desks. Another constitution and advantage of the transceiver according to this embodiment are the same as those of the embodiment of FIG. 2.

Instead of the antenna 93, it is possible to use a photo emitter/detector having a directional pattern such as a fan beam of a large half-power beam width for optical data transmission with user transceivers disposed on the desks.

FIG. 10 schematically shows another embodiment of the transceiver according to the present invention, used in the wireless LAN system shown in FIG. 1. The base transceiver according to this embodiment has a tubular housing 100 with substantially the same shape and dimension as those of the general linear type fluorescent lamp. The transceiver also has lamp bases at both axial ends of the housing 100, respectively. Two base pins 101 are projected from the respective lamp bases and thus these base pins can be detachably inserted into the sockets 11 so that the transceiver receives the power supply voltage from the fluorescent-lamp luminaire when inserted. It is a matter of course that these base pins 101 have the same standard as that of base pins of the general fluorescent lamp. The shape and dimension of the housing 100 may be freely modified so long as it can be fitted with the fluorescent-lamp luminaire.

Only one antenna 103 for radiating/receiving electromagnetic wave is formed on the outer or inner surface of the housing 100 or in the housing 100. This antenna 103 has a directional pattern such as a fan beam of a large half-power beam width and is used for radio data transmission both with the transmit-receive bus interface device 14 (shown in FIG. 1) and with the user transceivers disposed on the desks by changing the operation frequency. Because of usage of the single antenna, the constitution of the transceiver of this embodiment will be simplified nevertheless the data transmission efficiency may be somewhat lowered. Another constitution and advantage of the transceiver according to this embodiment are the same as those of the embodiment of FIG. 2.

Instead of the antenna 103, it is possible to use a single photo emitter/detector for radiating/receiving light, having a directional pattern such as a fan beam of a large half-power beam width for optical data transmission both with the transmit-receive bus interface device 14 (shown in FIG. 1) and with the user transceivers disposed on desks.

FIG. 11 schematically shows a further embodiment of the transceiver according to the present invention, used in the wireless LAN system shown in FIG. 1. The base transceiver according to this embodiment has a tubular housing 110 with a substantially similar shape as a general linear type fluorescent lamp but, shorter axial length The transceiver also has bases at the both axial ends of the housing 110, respectively. Two base pins 111, projected from the respective bases, are inserted into sockets 118a formed at ends of the housing adapters 118 which are axially coupled to the respective ends of the housing 110. Two base pins 118b are also formed at the other ends of the adapters 118, respectively, and can be detachably inserted into the sockets 11. In each of the adapters 118, terminals of the socket 118a and the base pins 118b are connected by wires 118c, respectively. Thus, the transceiver receives the power supply voltage from the fluorescent-lamp luminaire when the base pins 118b of the adapters 118 are inserted into the respective sockets 11. By using the adapters 118 capable of being axially integral with the housing 110, the transceiver according to the present invention can be fitted to various fluorescent-lamp luminaires having different intervals of sockets. It is a matter of course that these base pins 118b have the same standard as that of base pins of the general fluorescent lamp. The shape and dimension of the housing 110 and of the adapter 118 may be freely modified so long as they can be fitted with the fluorescent-lamp luminaire.

Similar to the housing 20 in the embodiment of FIG. 2, first and second antennas 112 and 113 for radiating/receiving electromagnetic wave are formed on the outer or inner surface of the housing 110 or in the housing 110. In the housing 110, there are power conversion circuits 114 for converting the received AC power supply voltage into DC voltage having a predetermined voltage value, and a transmit-receive unit 116. Another constitution and advantages of the transceiver according to this embodiment are the same as those of the embodiment of FIG. 2.

In modified cases, the housing adapter may include an additional lamp therein, or itself may be constituted by an additional lamp such as a fluorescent lamp. This can redress lowering of illumination due to the change of the existing fluorescent lamp to the base transceiver according to the present invention.

FIG. 12 schematically shows a still further embodiment of the transceiver according to the present invention, used in the wireless LAN system shown in FIG. 1. The base transceiver according to this embodiment has a tubular housing 120 with substantially similar shape as that of the general linear type fluorescent lamp but with a axially variable length. Telescopic tubular members 129 formed at the both axial ends of the housing 120, respectively, have respective lamp bases at one end thereof. Two base pins, projected from the respective lamp bases, can be detachably inserted into the sockets 11 so that the transceiver receives the power supply voltage from the fluorescent-lamp luminaire when inserted. Since the housing 120 has such the telescopic members 129 with variable length, the transceiver according to this embodiment can be fitted to various fluorescent-lamp luminaires having different intervals of sockets. It is a matter of course that these base pins have the same standard as that of base pins of the general fluorescent lamp. The shape and dimension of the housing 120 including the telescopic members 129 may be freely modified so long as they can be fitted with the fluorescent-lamp luminaire.

Similar to the housing 20 in the embodiment of FIG. 2, first and second antennas 122 and 123 for radiating-/receiving electromagnetic wave are formed on the outer or inner surface of the housing 120 or in the housing 120. In the housing 120, there are power conversion circuits 124 for converting the received AC power supply voltage into DC voltage having a predetermined voltage value, and a transmit-receive unit 126. Between the base pins and the power conversion circuit 124, between the power conversion circuits 124, and between the power conversion circuit 124 and the transmit-receive unit 126, there are electrical connection wires 128, respectively. Another constitution and advantage of the transceiver according to this embodiment are the same as those of the embodiment of FIG. 2.

Figure 13:
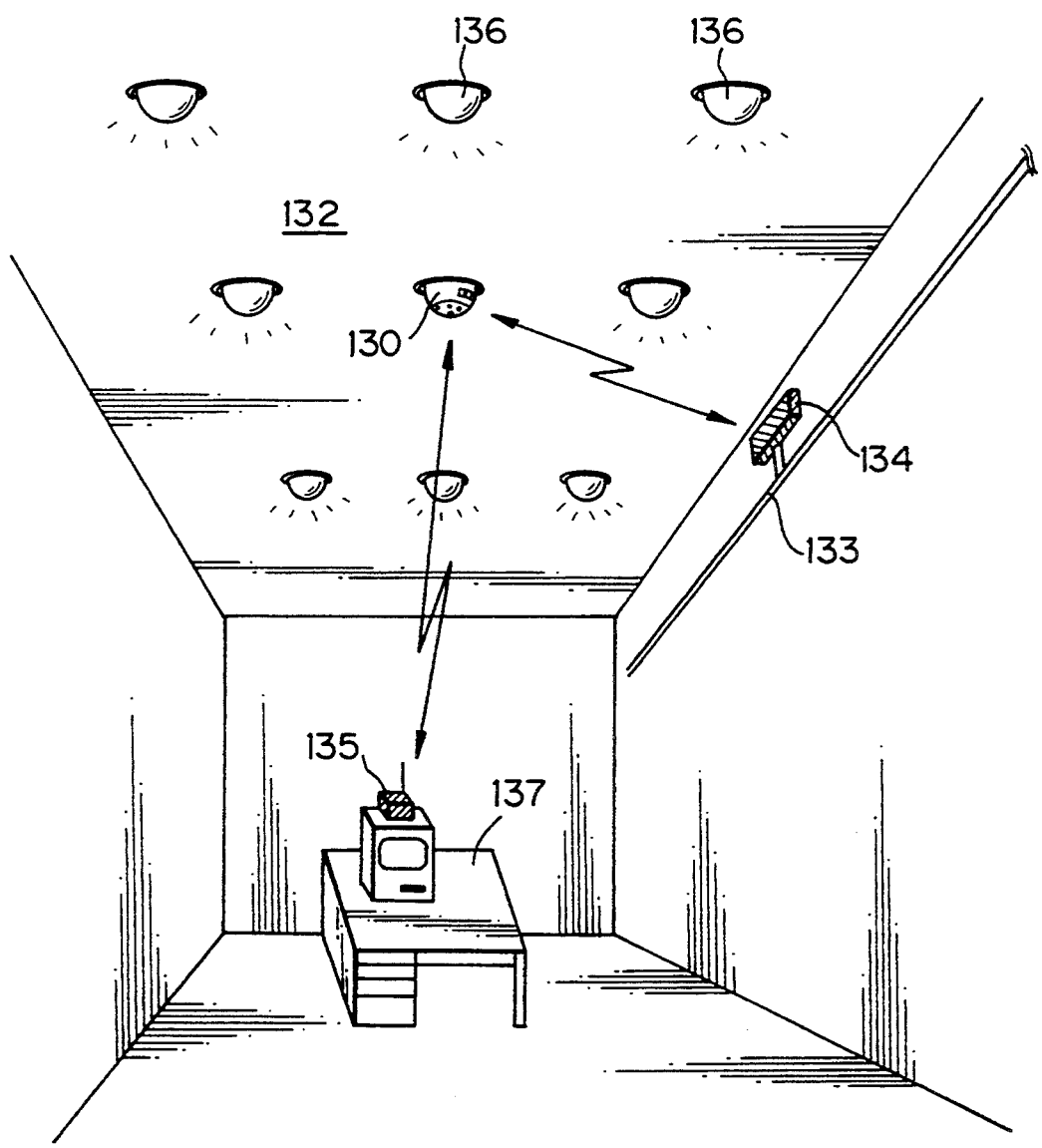
FIG. 13 shows in perspective an another example of a wireless LAN system using a transceiver according to the present invention.

Referring to FIG. 13 which shows in perspective another example of a wireless LAN system using a base transceiver according to the present invention, reference numeral 130 denotes the base transceiver fitted, instead of an incandescent lamp, to a lamp socket of an incandescent-lamp luminaire installed at the ceiling 132 of such as an office building. In FIG. 13, furthermore, reference numeral 133 denotes a bus of LAN, installed along the inner wall of the office, 134 a transmit-receive bus interface device, and 135 a user transceiver disposed in the office and connected to a user terminal.

In general, a plurality of incandescent-lamp luminaires are installed at the ceiling 132 of the office and at least one of incandescent lamp 136 is fitted with each of the luminaires. In order to install the base transceiver 130, one of the incandescent lamps 136, preferably one positioned near the center of the ceiling, is removed from the luminaire and then a lamp base of the transceiver 130 having a housing with the similar shape as that of the removed incandescent lamp is engaged with its lamp socket.

By using radio antennas provided on the surface of the housing or in the housing, the transceiver 130 will execute radio data transmission with the bus interface device 134 and execute radio data transmission with the user transceiver 135 on a desk 137.

Figure 14:
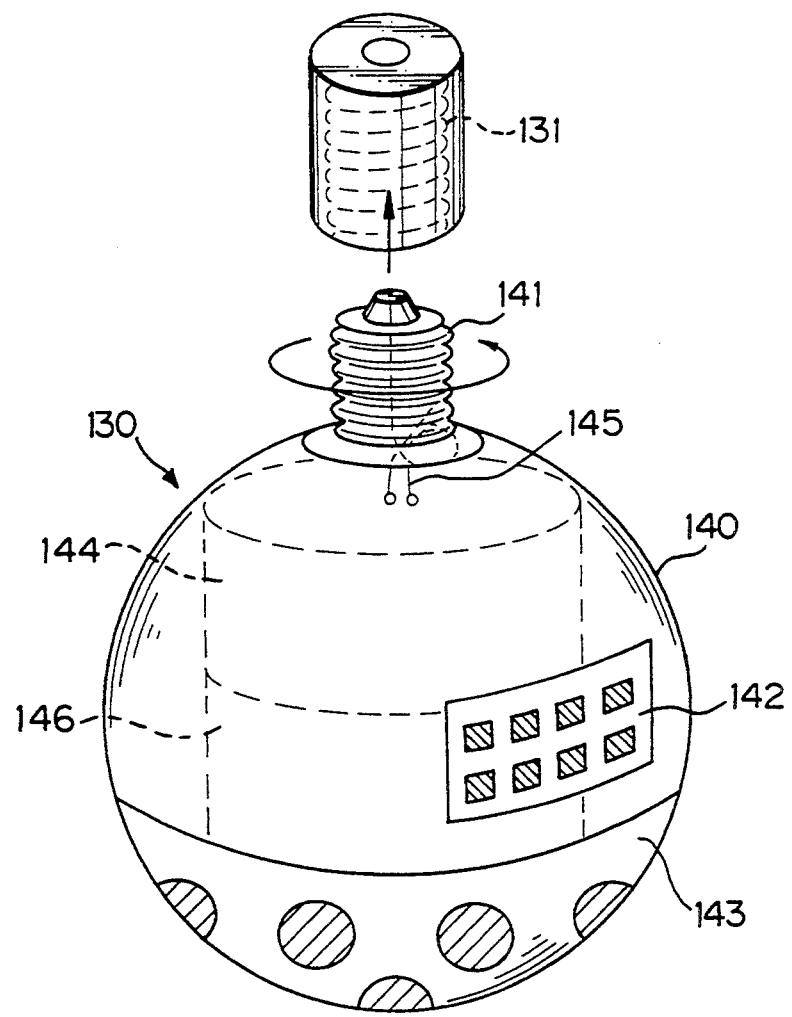
FIG. 14 schematically shows a preferred embodiment of a transceiver according to the present invention, which is used in the wireless LAN system shown in FIG. 13.

FIG. 14 is an exploded view schematically showing a preferred embodiment of the transceiver used in the wireless LAN system shown in FIG. 13 and the lamp socket 131 of the incandescent-lamp luminaire attached to the ceiling as mentioned before. The transceiver 130, according to this embodiment, has a spherical housing 140 with substantially the same shape and dimension as those of the general incandescent lamp bulb. The transceiver 130 also has a lamp base 141 projected from the housing 140 and provided with the same standard as that of the lamp base of the changed incandescent lamp. The lamp base 141 can be detachably engaged with the socket 131 so that the transceiver receives the commercial power supply voltage from the incandescent-lamp luminaire when engaged. The shape and dimension of the housing 140 may be freely modified so long as it can be fitted with the incandescent-lamp luminaire.

First and second antennas 142 and 143 for radiating-/receiving electromagnetic wave are formed on the outer or inner surface of the housing 140 or in the housing 140. The housing 140 itself may be made of various material such as metallic material or material which passes light or electromagnetic wave. If the housing 140 is made of dielectric material, a part of it can be utilized as a micro-strip substrate of the antennas. If it is made of metal, it may be used as a ground plane of the antennas. In case that a part of the housing 140 itself is utilized as elements of the plane antennas, the number of the elements can be reduced and also the antennas can be more easily constructed.

In the housing 140, there is a power conversion circuit 144, electrically connected to the lamp base 141 via wires 145, for converting the received AC power supply voltage into DC voltage having a predetermined voltage value, and a transmit-receive unit 146.

Figure 15:
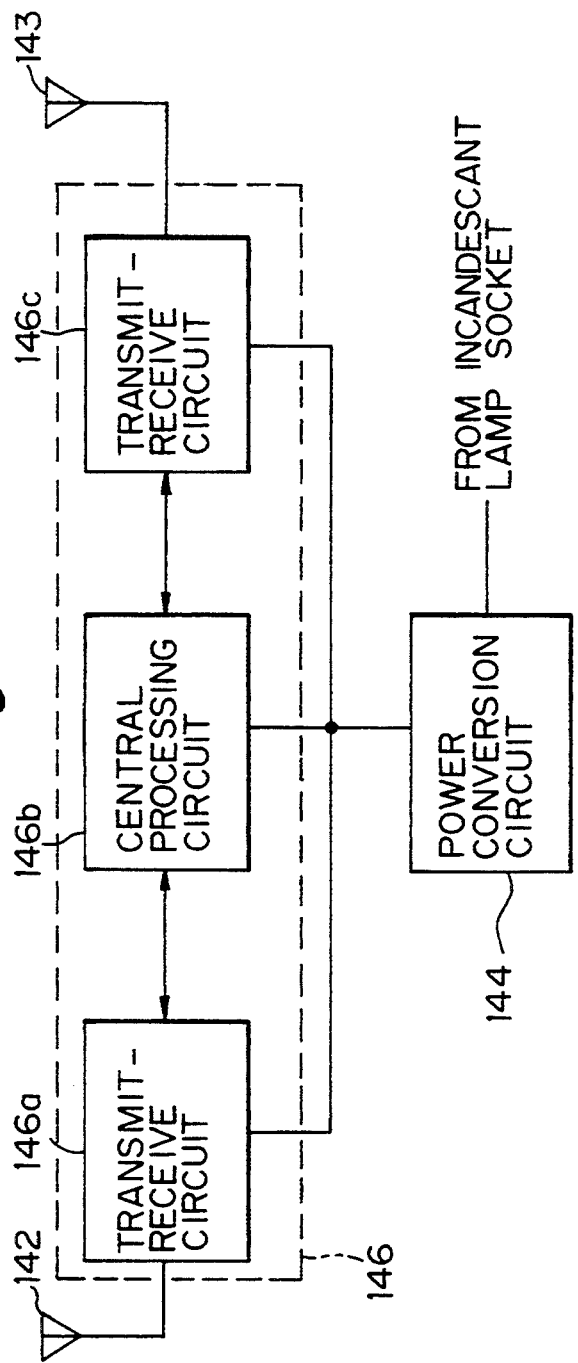
FIG. 15 shows a block diagram illustrating an inner electrical constitution of the transceiver shown in FIG. 14.

FIG. 15 shows a block diagram schematically illustrating an inner electrical constitution of the transceiver 130. As shown in this figure, the first antenna 142 is electrically connected to a first transmit-receive circuit 146a and the second antenna 143 is electrically connected to a second transmit-receive circuit 146c. The first and second transmit-receive circuits 146a and 146c are electrically connected to a central processing circuit 146b. These first transmit-receive circuit 146a, central processing circuit 146b and second transmit-receive circuit 146c, constituting the transmit-receive unit 146 shown in FIG. 14, are supplied with DC power voltage from the power conversion circuit 144.

The first and second antennas 142 and 143 have respective directional patterns which are different from each other. The first antenna 142 having a directional pattern, such as a pencil beam of a small half-power beam width, is used for radio data transmission with the transmit-receive bus interface device 134 (shown in FIG. 13). The second antenna 143 having a directional pattern, such as a fan beam of a large half-power beam width, is used for radio data transmission with the user transceiver 135 disposed on the desk 137 (shown in FIG. 13) or with another user transceivers (not shown). By scanning the beam of the second antenna 143 or by switching its beams, the best path with the highest transmission quality can be secured between the base transceiver and each of the user transceivers. In this embodiment, centimeter wave near millimeter wave, with frequency range of about 20 to 30 GHz is adopted for the carrier wave of the transceiver, and four-phases QPSK system is used for modulation. However, the frequency range of the carrier wave and the modulation system of the transceiver according to the present invention will not be limited to the above-mentioned particular range and system.

Figure 16:
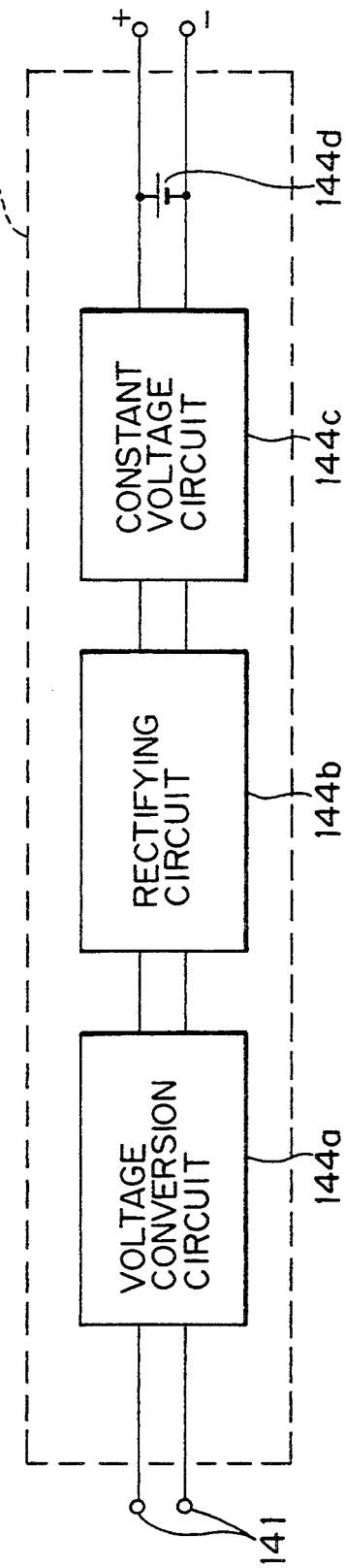
FIG. 16 shows a block diagram schematically illustrating an electrical constitution of a power conversion circuit of the transceiver shown in FIG. 14.

FIG. 16 shows a block diagram schematically illustrating an electrical constitution of the power conversion circuit 144 of the transceiver 130 shown in FIG. 14. In the figure, reference numeral 144a denotes a voltage conversion circuit, connected to the lamp base 141, for converting the commercial AC voltage into a predetermined voltage (several volt to over ten volt). A rectifying circuit 144b for converting AC voltage into DC voltage is connected to the outputs of the conversion circuit 144a. A constant-voltage circuit 144c is connected to the outputs of the rectifying circuit 144b. The outputs of the constant-voltage circuit 144c are connected to the outputs of the power conversion circuit 144. A chargeable battery 144d is connected in parallel to the outputs of the circuit 144. This battery 144d supplies all the circuits in the transceiver 130 with DC power voltage so that the transmit-receive operation can be maintained even when the commercial power supply is turned off by mistake.

As aforementioned, the transceiver according to this embodiment can receive power voltage from the power supply of the incandescent-lamp luminaire installed on the ceiling of the building only by fitting the transceiver with the luminaire instead of the incandescent lamp. Thus, no power supply cable is necessary for additionally wiring in order to energize the base transceiver. Also, since the transceiver is fitted to the existing luminaire already installed on the ceiling, it can be installed at an adequate position of the ceiling without executing additional construction such as a construction for reinforcing the ceiling. Furthermore, since wireless data transmission is executed with the transmit-receive bus interface device connected to the bus of LAN, no data transmission cable is necessary for additional wiring between the base transceiver and the bus interface device.

Figure 17:
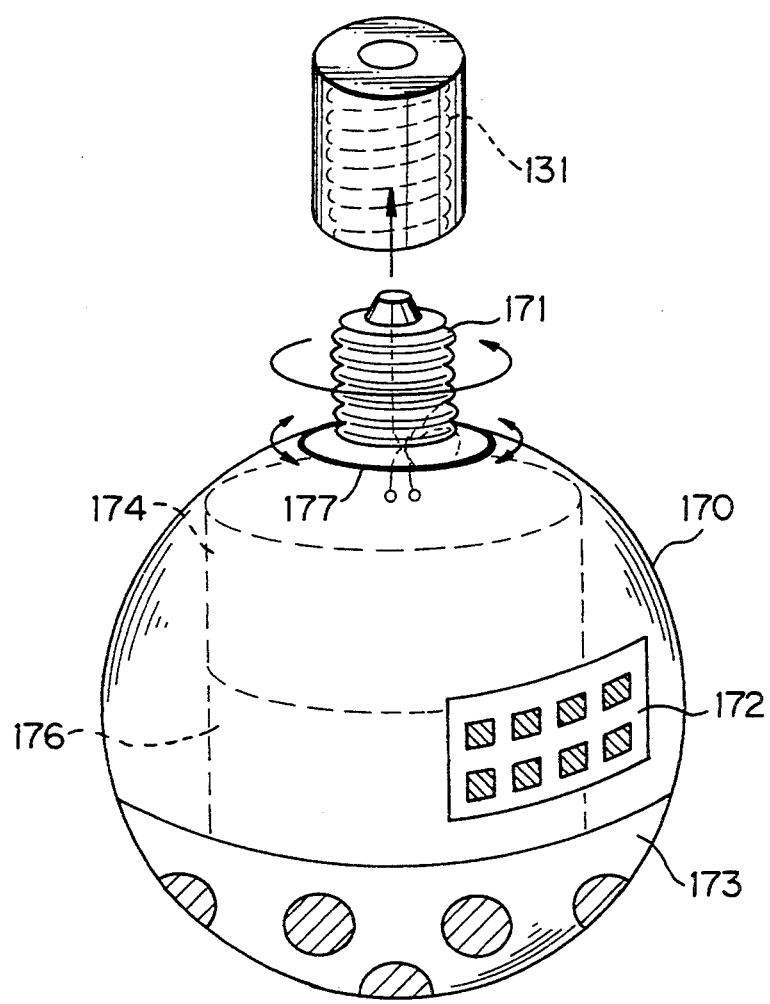
FIG. 17 schematically shows an another embodiment of a transceiver according to the present invention, which is used in the wireless LAN system shown in FIG. 13.

FIG. 17 is an exploded view schematically showing another embodiment of the transceiver used in the wireless LAN system shown in FIG. 13 and the lamp socket 131 of the incandescent-lamp luminaire attached to the ceiling as mentioned before. The base transceiver according to this embodiment has a spherical housing 170 with substantially the same shape and dimension as those of the general incandescent lamp, and has a lamp base 171 having the same standard as that of the lamp base of the changed illumination lamp. The lamp base 171 can be detachably engaged with the socket 131 so that the transceiver receives the power supply voltage from the incandescent-lamp luminaire when engaged. The shape and dimension of the housing 170 may be freely modified so long as it can be fitted with the incandescent-lamp luminaire.

First and second antennas 172 and 173 for radiating-/receiving electromagnetic wave are formed on the outer or inner surface of the housing 170 or in the housing 170. In the housing 170, there is a power conversion circuit 174, electrically connected to the lamp base 171, for converting the received AC power supply voltage into DC voltage having a predetermined voltage value, and a transmit-receive unit 176. Constitution and operation of the first and second antennas 172 and 173, the power conversion circuit 174, and the transmit-receive unit 176 are completely the same as those of the base transceiver of FIG. 14.

According to this embodiment, a rotary joint 177 is attached to the housing 170 at a Jointing portion between the housing 170 and the lamp base 171. By means of this rotary joints 177, the housing 170 is rotatable for ±180 degrees with respect to its central axis even when the housing is fixed by engaging the base 171 with the socket 131. A latching member (not shown) may be assembled with the rotary joint 177 for preventing further rotation of the housing 170. As the housing 170 can be rotated after fitting it with the luminaire, the antennas can be always set to optimum directions. Another constitution and advantage of the transceiver according to this embodiment are the same as those of the embodiment of FIG. 14.

Figure 18:
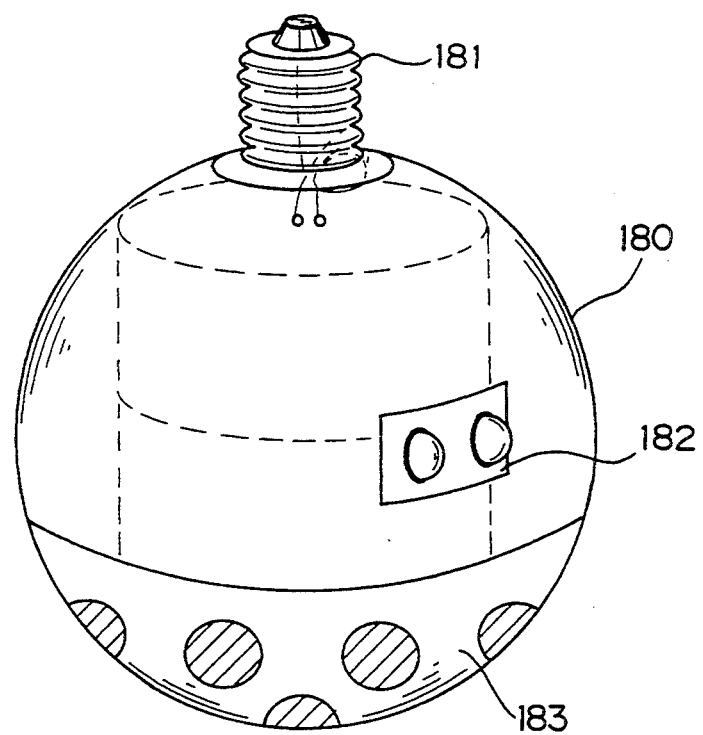
FIG. 18 schematically shows a further embodiment of a transceiver according to the present invention, which is used in the wireless LAN system shown in FIG. 13.

FIG. 18 schematically shows a further embodiment of the transceiver according to the present invention, used in the wireless LAN system shown in FIG. 13. The base transceiver according to this embodiment has a spherical housing 180 with substantially the same shape and dimension as these of the general incandescent lamp, and has a lamp base 181 having the same standard as that of the lamp base of the changed illumination lamp. The lamp base 181 can be detachably engaged with the socket 131 so that the transceiver receives the power supply voltage from the incandescent-lamp luminaire when engaged. The shape and dimension of the housing 180 may be freely modified so long as It can be fitted with the incandescent-lamp luminaire.

On the outer or inner surface of the housing 180 or in the housing 180, a photo emitter/detector 182 for radiating/receiving light is formed instead of the first antenna 142 in the embodiment of FIG. 14, and also an antenna 183 similar to the second antenna 143 is formed.

The photo emitter/detector 182 having a directional pattern such as a pencil beam of a small half-power beam width is used for optical data transmission with the transmit-receive bus interface device 134 (shown in FIG. 13). The antenna 183 having a directional pattern such as a fan beam of a large half-power beam width is used for radio data transmission with the user transceivers disposed on the desks. Another constitution and advantages of the transceiver according to this embodiment are the same as those of the embodiment of FIG. 14.

Instead of the antenna 183, it is possible to use a photo emitter/detector for radiating/receiving light, having a directional pattern such as a fan beam of a large half-power beam width for optical data transmission with the user transceivers disposed on the desks.

Figure 19:
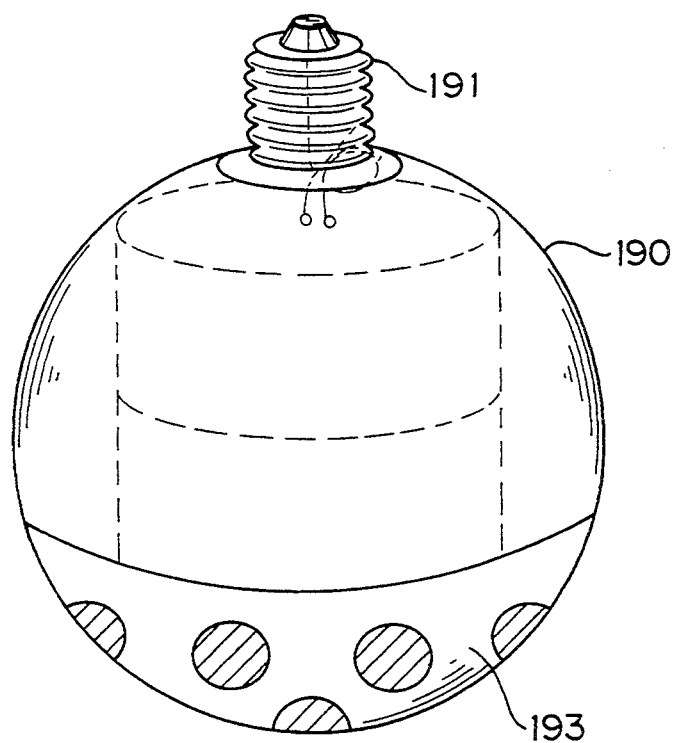
FIG. 19 schematically shows a still further embodiment of a transceiver according to the present invention, which is used in the wireless LAN system shown in FIG. 13.

FIG. 19 schematically shows a still further embodiment of the transceiver according to the present invention, used in the wireless LAN system shown in FIG. 13. As similar to that in the embodiment of FIG. 14, the base transceiver according to this embodiment has a spherical housing 190 with substantially the same shape and dimension as these of the general incandescent lamp, and has a lamp base 191 having the same standard as that of the lamp base of the changed illumination lamp. The lamp base 191 can be detachably engaged with the socket 131 so that the transceiver receives the power supply voltage from the incandescent-lamp luminaire when engaged. The shape and dimension of the housing 190 may be freely modified so long as it can be fitted with the incandescent-lamp luminaire.

An only one antenna 193 for radiating/receiving electromagnetic wave is formed on the outer or inner surface of the housing 190 or in the housing 190. This antenna 193 has a directional pattern such as a fan beam of a large half-power beam width and is used for radio data transmission both with the transmit-receive bus interface device 134 (shown in FIG. 13) and with the user transceivers disposed on the desks by changing the operation frequency. Because of usage of the single antenna, the constitution of the transceiver of this embodiment will be simplified nevertheless the data transmission efficiency may be somewhat lowered. Another constitution and advantages of the transceiver according to this embodiment are the same as those of the embodiment of FIG. 14.

Instead of the antenna 193, it is possible to use a single photo emitter/detector for radiating/receiving light, having a directional pattern such as a fan beam of a large half-power beam width for optical data transmission both with the transmit-receive bus interface device 134 (shown in FIG. 13) and with the user transceivers disposed on the desks.

Figure 20:
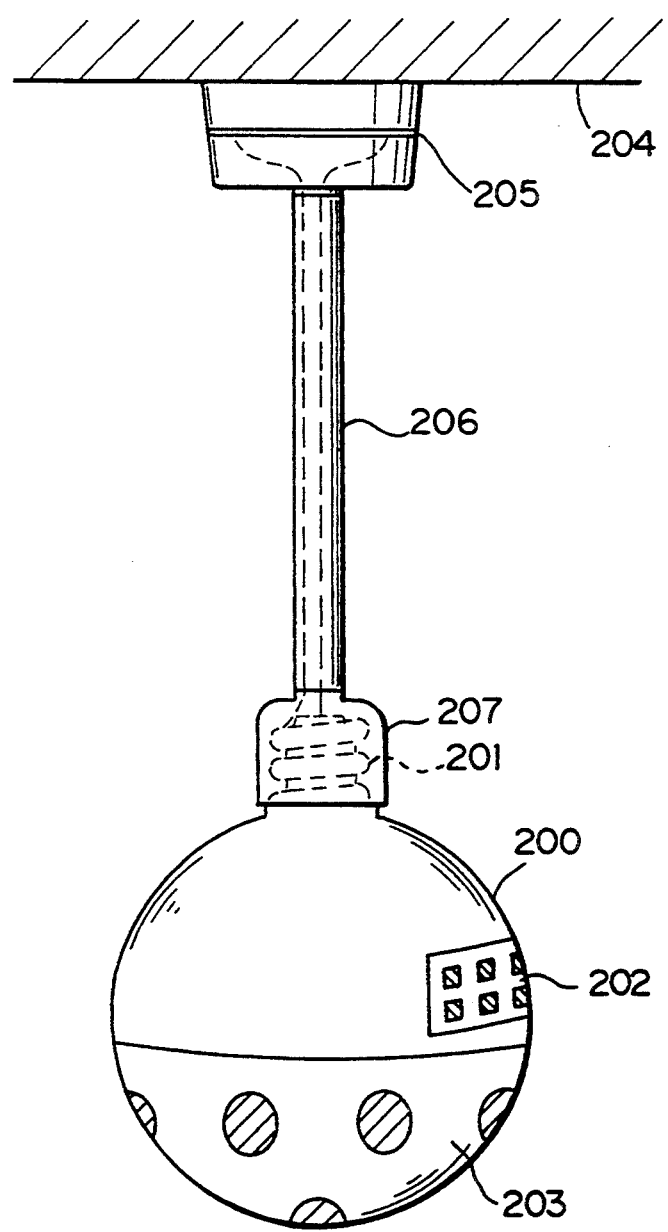
FIG. 20 schematically shows an another embodiment of a transceiver according to the present invention, which is used in the wireless LAN system shown in FIG. 13.

FIG. 20 schematically shows another embodiment of the transceiver used in the wireless LAN system shown in FIG. 13. In this embodiment, the base transceiver is fitted with a pendant luminaire not with the ceiling luminaire attached directly to the ceiling as shown in the embodiment of FIG. 14. The base transceiver itself has a spherical housing 200 with substantially the same shape and dimension as these of the general incandescent lamp, and has a lamp base 201 having the same standard as that of the lamp base of the changed illumination lamp. The lamp base 201 can be detachably engaged with the socket 207 mounted at the end of a pendant pipe 206 which is elongated from a detachably coupled ceiling rossete 205 attached to the ceiling 204 so that the transceiver receives the power supply voltage from the incandescent-lamp luminaire when engaged. The shape and dimension of the housing 200 may be freely modified so long as it can be fitted with the incandescent-lamp luminaire.

First and second antennas 202 and 203 for radiating/receiving electromagnetic wave are formed on the outer or inner surface of the housing 200 or in the housing 200. Another constitution and advantages of the transceiver according to this embodiment are the same as those of the embodiment of FIG. 14.

Many widely different embodiments of the present invention may be constructed without departing from the spirit and scope of the present invention. It should be understood that the present invention is not limited to the specific embodiments described in the specification, except as defined in the appended claims.

What is claimed is:

1. A transceiver used for a wireless in-building communication system comprising:
   a housing to be fitted with a fluorescent-lamp luminaire having two lamp sockets to which AC power supply voltage is supplied;
   at least one lamp base projected from said housing so as to be engaged with said lamp socket, for receiving the AC power supply voltage from said luminaire;
   means for radiating/receiving electromagnetic wave, disposed on a surface of said housing or in said housing, said radiating/receiving means including a first radiating/receiving means for radiating/receiving electromagnetic wave with a directional pattern of a small half-power beam width, and a second radiating/receiving means for radiating/receiving electromagnetic wave with a directional pattern of a large half-power beam width, and first radiating/receiving means being used for wireless transmission with a transmit-receive bus interface means, said second radiating/receiving means being used for wireless transmission with at least one user transceiver;
   a power conversion circuit disposed in said housing, for converting the AC power supply voltage received via said lamp base into DC voltage having a predetermined voltage value; and
   at least one transmit-receive circuit disposed in said housing and coupled with said radiating/receiving means so as to execute transmit-receive operation, said transmit-receive circuit being operated by the DC voltage supplied from said power conversion circuit.

2. A transceiver as claimed in claim 1, wherein at least one of said first and second radiating/receiving means includes a radio antenna.

3. A transceiver as claimed in claim 2, wherein said antenna is constituted by a part of said housing.

4. A transceiver as claimed in claim 1, wherein said second radiating/receiving means includes two radio antennas having diversity function.

5. A transceiver as claimed in claim 1, wherein at least one of said first and second radiating/receiving means includes a photo emitter/receiver.

6. A transceiver as claimed in claim 1, wherein said transceiver includes at least one rotary joint means fixed to said housing so that said lamp base is rotatable with respect to said housing by at least ±180 degrees.

7. A transceiver as claimed in claim 1, wherein said power conversion circuit includes a voltage conversion circuit for converting the received AC power supply voltage into AC voltage having a predetermined voltage value, a rectifying circuit for converting the AC voltage into DC voltage, and a chargeable battery coupled in parallel to the outputs of said rectifying circuit.

8. A transceiver as claimed in claim 1, wherein said transceiver includes two lamp bases formed at respective ends of said housing, each of said lamp bases having two base pins projected its end and capable of being inserted into said lamp socket.

9. A transceiver as claimed in claim 1, wherein said transceiver includes two housing adapters axially coupled to respective ends of said housing.

10. A transceiver as claimed in claim 9, wherein said housing adapters have additional lamps, respectively.

11. A transceiver as claimed in claim 1, wherein said housing includes a telescopic tubular housing witch axially variable length.

12. A transceiver as claimed in claim 1, wherein said luminaire is a ceiling luminaire directly attached to a ceiling.

13. A transceiver as claimed in claim 1, wherein said luminaire is a pendant luminaire.

* * * * *